United States Patent

Winkler

[15] 3,700,748

[45] Oct. 24, 1972

[54] SELECTIVELY HYDROGENATED BLOCK COPOLYMERS

[72] Inventor: De Loss E. Winkler, Orinda, Calif.

[73] Assignee: Shell Oil Company, New York, N.Y.

[22] Filed: May 22, 1970

[21] Appl. No.: 39,919

[52] U.S. Cl. ................................260/879, 260/880 B
[51] Int. Cl. ..........................C08f 19/08, C08f 27/24
[58] Field of Search ...........................260/879, 880 B

[56] References Cited

UNITED STATES PATENTS 3,431,323  3/1969  Jones.........................260/880
3,526,606  9/1970  Minekawa et al. ............260/5

Primary Examiner—James A. Seidleck
Assistant Examiner—Richard A. Gaither
Attorney—Joseph W. Brown and William H. Myers

[57] ABSTRACT

Block polymers are provided having substantially improved capability of forming stable elastomeric polar derivatives, these block polymers being prepared by block polymerizing a monovinyl arene with butadiene, the butadiene block containing between about 8 and about 80 percent 1,2-structure and thereafter selectively hydrogenating so as to substantially eliminate the unsaturation in the pendant vinyl groups.

8 Claims, No Drawings

SELECTIVELY HYDROGENATED BLOCK COPOLYMERS

This invention is concerned with the production of block copolymers. More particularly, it is directed to the preparation of selectively hydrogenated block copolymers especially useful for further derivatization.

The art of block copolymer formation has developed rapidly in the past few years, with the result that a number of block copolymer types have been proposed. These block copolymers may have two or more polymer blocks and may be either essentially linear or branched in at least part of the entire molecule. They may be prepared by a variety of processes one of which involves sequential addition of the individual monomers to form the individual polymer blocks or a combination of sequential addition and coupling may be employed. The choice of the coupling agent has been found to be important in creating the desired structure, i.e., linear or non-linear products. Furthermore, the art has been directed in part to the production of derivatives of these block polymers so as to modify them with polar radicals. Also, hydrogenation has been utilized to improve their oxidative stability and alter their service temperatures. The set of physical characteristics may be tailor made by choosing the alternatives listed above as well as by controlling the individual block molecular weights as well as the ratio of the different species of blocks. For example, when rubbery products are desired, it is preferred to utilize as one of the monomers a conjugated diene which is then utilized to form a predominating amount on a weight basis of the polymer blocks. On the other hand, if thermoplastic non-rubbery products are required, a monomer normally capable of forming a thermoplastic resin is employed as the predominating monomer such as styrene or alpha methyl styrene.

In the usual formation of a block copolymer according to the prior art, it has been found that a simple structure such as A-B-A wherein each A is a monovinyl arene polymer block and B is a conjugated diene polymer block will have so-called thermoplastic elastomeric properties if the entire polymer contains less than about 55 weight percent of the A type blocks. These are usually prepared by the use of a lithium-based catalyst, preferably a lithium alkyl. It is known that this produces in the conjugated diene block a mixture of several types of structures which in the art are referred to as cis 1,4-, trans 1,4-, and 1,2-structures. These refer to the way in which the diene units are attached to one another. In the cis and trans 1,4 varieties, the carbon atom arrangement is all in line with no carbon atoms pendant from the backbone carbon atom chain. When 1,2-structures are present, the structure is such that pendant vinyl groups are present, these being directly attached to the two remaining carbon atoms of the diene monomer unit to which they were originally attached. Unless great care is taken, the normal diene polymerization will result in all three types being present in a polymer block. However, means may be utilized as known in the art for maximizing any one of these types if so desired.

As stated hereinbefore, one of the avenues of development in block polymers has been the formation of a variety of derivatives thereof wherein the derivatization has resulted in the combination of polar groups at various points in the polymer chain. A number of reactions are known for this purpose, including hydrohalogenation, halogenation, carboxylation, epoxidation, hydroxylation, chlorosulfonation, and other derivative processes. The polar derivatives so formed may be useful for a number of commercial purposes but up to the present time a major obstacle has limited their use. This is that in most cases where an effective proportion of polar groups have been formed on the block polymer chain the resulting products are non-elastomeric and have lost their formerly desirable set of physical properties. This apparently is due to the cyclization which may occur during derivatization on the pendant vinyl double bonds, and the formation of unstable polar groups on tertiary carbon atoms present in the backbone carbon chain. This allows ready decomposition of the product and loss of elastomeric properties to such a degree that the products have relatively little commercial utility.

It is an object of the present invention to provide improved block copolymers. It is a particular object of the invention to provide a process for the production of such copolymers. It is a special object of the invention to provide block copolymers capable of forming improved block copolymer derivatives. Other objects will become apparent during the following detailed description of the invention.

Now, in accordance with the present invention, a block copolymer is provided satisfying the above objects which comprises a partially hydrogenated block copolymer having, prior to hydrogenation, at least one monovinyl arene polymer block and at least one polybutadiene block wherein the polybutadiene block has between about 8 and about 80 percent 1,2-structure showing infrared absorbance at 10.98 microns and 10.05 microns, the balance of the polybutadiene block being 1,4-structured, said block copolymer being selectively hydrogenated so as to remove substantially all unsaturation in the pendant vinyl groups and no more than about 50 percent of the unsaturation in the 1,4-structured portions of the block. In accordance with the present invention, it has been found that such selectively hydrogenated block copolymers are especially promising precursors useful for the formation of polar derivatives. They are moreover useful as polymers without further derivatization if so desired. The substantial elimination of unsaturation in the pendant vinyl groups which are inherent in the 1,2-structure portion of the butadiene block virtually eliminates the possibility of any addition reactions taking place on these pendant groups. Therefore, any derivatization such as, for example, hydrohalogenation, occurs only on carbon atoms forming a part of the backbone carbon chain. This results in a product which does not tend to cyclize during later derivatization steps. Moreover, since butadiene is the diene employed in the polymers of the present invention, no tertiary carbon atoms are present in the backbone carbon chain as would be present in a similar polyisoprene polymer block. Consequently, any groups which are attached to the backbone carbon atoms are attached only to secondary carbon atoms and moreover are spaced apart from one another by a minimum of four carbon atoms.

The preparation of the precursor block copolymer may follow processes broadly known in the block polymer art. In general, the products will have the general formula A-B—(B-A)$_{0-5}$. According to this formula, each A, prior to hydrogenation represents a monovinyl arene block and each B represents a polybutadiene block. Where at any point two essentially identical blocks B are directly connected (except for any residue of a coupling agent), the connected blocks are considered to be a single block for the purpose of describing block molecular weights, etc. Thus, this general formula includes the following types: Where the subscript is 0, a two-block copolymer results having the structure A—B. Where the subscript is 1, the resulting structure is A—B—A, which is a linear block copolymer structure. Branched structures are obtained when the subscript is between 2 and 5. For example, where a tetrafunctional coupling agent is employed, the structure will be represented as follows:

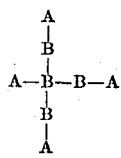

It will be understood that these general formula have been written to include either sequentially formed species or species which have been formed at least in part by the use of coupling agents. In the latter instance, any residues of the coupling agents have been ignored in these general formulas. For example, when the coupling agent is a species such as silicon tetrachloride, the latter type of polymer may be written to include the coupling residue as follows:

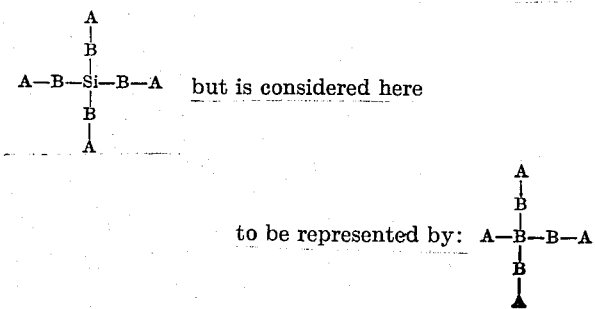

The monovinyl arene polymer blocks A are prepared from such monomers or mixtures thereof as styrene, alpha methyl styrene, ring alkylated styrenes and the like. Styrene and alpha methyl styrene are preferred species. These may be modified by minor proportions based on the proportion of monovinyl arene of copolymerizable monomers such as conjugated dienes, vinyl pyridines and the like. Solution polymerization is preferred and for this purpose lithium-based catalysts are utilized which may be either monofunctional, e.g., lithium alkyls or polyfunctional, e.g., dilithionaphthalene.

The monomers are dispersed in suitable inert solvents such as alkenes, alkanes, cycloalkenes or cycloalkanes such as butenes, pentenes, butanes, pentanes, cyclopentene, cyclopentane or cyclohexane, as well as their mixtures. Anaerobic conditions are essential and a high state of purification of the monomers and solvents also is highly desirable if not essential. This may be achieved by scavenging any reactive impurities with carefully introduced portions of a polymerization initiator prior to introduction of the main body of the initiator for the purpose of polymerizing the desired monomer. As a simple illustration, styrene is introduced into cyclohexane and impurities are scavenged therefrom by the introduction of small amounts of a lithium alkyl such as lithium secondary butyl to the point of incipient polymerization. At this point, a sufficient amount of lithium alkyl is added to initiate polymerization and form a polymer block of styrene of predetermined molecular weight, said block being associated at one end with a lithium ion. Thereafter, butadiene is injected into the system preferably previously scavenged with lithium secondary butyl to remove any undesired impurities. The butadiene block polymerizes with the living polystyrene block, polymerization being carried to a predetermined extent to form a polybutadiene block having a desired average molecular weight. The associated lithium ions may be removed or neutralized by the addition of polar materials such as an alcohol, water, or oxygen.

The linear three-block polymer A-B-A may be formed by a second addition of monovinyl arene monomer such as styrene to the living polymer block A-B-Li and continuing polymerization until the A-B structure is completed. Alternatively, the intermediate living block copolymer A-B-Li is formed in such a way that the average molecular weight of B is only about one-half that desired in the final polymer. At this point, a difunctional coupling agent such as a dihaloalkane may be added to the reaction mixture to form the dicoupled product A-(B-B)-A.

If star-shaped, radial, branched, or non-linear (depending on the nomenclature preferred) are desired, the intermediate block copolymer A—B—Li is first synthesized and thereafter a polyfunctional coupling agent is injected into the living polymer system to form a branched coupled product as indicated in the general formulas above. Suitable coupling agents of this type include silicon polyhalides such as silicon tetrachloride, diesters of dicarboxylic acids with monohydric alcohols, such as diethyl adipate and other polyfunctional coupling agents known in this art.

While molecular weights are not a limiting feature of the present invention, the blocks A usually have average molecular weights of 2,000–50,000 and the blocks B have average molecular weights of 10,000–250,000, as determined by tritium counting methods.

In all of the above typical reactions, means must be taken to achieve the degree of 1,2-structure desired in the polybutadiene block. This is readily controlled by including in the reaction mixture at least during the formation of the polybutadiene block a polar material such as an ether, thioether or a secondary amine. Typical of these are diethyl ether, tetrahydrofuran or diethyl amine. The 1,2-structure in the polybutadiene block should be between about 8 and about 80 percent as determined by infrared analysis.

The block copolymer prepared by this or equivalent processes and having the recited proportion of 1,2-structure in the polybutadiene block(s) is now in condition for selective hydrogenation to prepare the desired partially hydrogenated products. The objective in this hydrogenation step is to substantially completely hydrogenate the unsaturated linkages present in the pendant vinyl groups which are the result of the 1,2-structure formation, while at the same time hydrogenating no more than 50 percent of the unsaturated bonds which lie in the backbone carbon chain. Preferably, less than about 25 percent of the backbone double bonds are hydrogenated, the objective being to eliminate those double bonds which lie in areas, e.g., pendant vinyl groups resulting in undesirable cyclization while at the same time leaving exposed double bonds in the backbone carbon chain where derivatization is highly desirable.

Hydrogenation is preferably carried out in solution in an inert hydrocarbon, preferably the same hydrocarbon solvent employed during polymerization. Polymerization catalysts comprise preferably, but not exclusively, the cobalt, nickel, or iron carboxylates or alkoxides including acetyl-acetonates of Ni or Ca reduced with an aluminum alkyl compound. Hydrogenation conditions are selected to mildly hydrogenate, the vinyl unsaturation being the first to become saturated. Consequently, the preferred hydrogenation pressures are between about 1 atmosphere and about 1,500 psig partial pressure of hydrogen, preferably 100–1200 psig. The hydrogenation temperatures are preferably between about 25° and about 100°C. The time of hydrogenation under such conditions will normally be between about 0.1 and about 2 hours.

The monovinyl arene blocks ordinarily will not be hydrogenated to any appreciable extent under these mild selective hydrogenation conditions since it has been found that substantially all of the aliphatic double bonds will be hydrogenated prior to any appreciable amount of aromatic double bond saturation.

The product resulting from this selective hydrogenation may be examined by infrared analysis to determine the presence or absence of any vinyl groups. In the usual infrared analysis, any trans structure will show strong absorbance at 10.35 microns, while any cis structures will show absorbance at 13.60 microns. The 1,2-structure shows absorbance at two-wave lengths, namely, 10.98 and 10.05 microns. It is desirable in the final product that substantially no absorbance in these latter two-wave lengths be observed in the selectively hydrogenated product. The products of the present invention will be found to have a substantially reduced iodine number from that of the original material. This will depend in part upon the proportion of the conjugated diene polymer block(s) in the starting products. However, in the product of most commercial utility, the iodine number prior to selective hydrogenation will be in the order of 200–400, while the selectively hydrogenated products will usually have an iodine number in the order of 50–150 grams iodine added per 100 g of polymer.

The following working example illustrates the preparation of the precursor block copolymer, the selective hydrogenation thereof, and the physical properties of the latter product.

EXAMPLE I

Preparation of Block Copolymer

All monomers and solvents were treated to remove water, oxygen, and polar materials and the polymerization was done under a nitrogen blanket.

There was charged to a reactor 4,200 g of cyclohexane and 468 g of styrene. Any impurities were titrated with sec-butyllithium and then 0.031 moles of sec-butyllithium in 275 g solution in cyclohexane was added and the polymerization was run for 1 hour at 50°C to convert essentially all of the styrene monomers. A sample (132 g) of solution was withdrawn for analysis.

The above living polymer solution was transferred to a second reactor which contained 2,160 g of butadiene, 11,535 g of cyclohexane and 50 g of THF (THF/Li=20) pretitrated with sec-BuLi. The butadiene was essentially all consumed after 3 hours at 40°. Removed sample for analysis. (THF is tetrahydrofuran.)

There was then added a pretitrated solution of 442 g of styrene in 2,650 g of cyclohexane. After 1 hour at 45°, the polymerization was complete. A third sample was removed for analysis. Block lengths were found to be 13,000–68,000–15,000 by a tritium method, and the butadiene block had 46 percent 1,2-structure.

Partial Hydrogenation of the Block Copolymer

The polymer solution from the above preparation was charged to a hydrogenation autoclave. For catalyst, 6 mmoles of Ni acetylacetonate [Ni($C_5H_7O_2$)$_2$] plus 12 mmoles of triethyl aluminum reacted for 15 minutes at 25°C in 1,500 mole of cyclohexane were added. The autoclave was pressured to 500 psig with hydrogen. The temperature rose to 50°C. After 25 minutes, the polymer had an iodine number of 81 and was suitable for derivatization.

Pertinent physical properties were as follows:

| | |
|---|---|
| Tensile strength at break, psi | 7000 |
| 300% Modulus, psi | 650 |
| Elongation at break, % | 590 |
| Set at break, % | 20 |

I claim as my invention:

1. A partially hydrogenated block copolymer having at least one monovinyl arene polymer block and at least one polybutadiene block wherein the polybutadiene block has between about 8 and about 80 percent 1,2-structure showing infrared absorbance at 10.98 microns and 10.05 microns, the balance being 1,4-structure, said block copolymer being selectively hydrogenated so as to remove substantially all unsaturation in the pendant vinyl groups and no more than about 50 percent of the unsaturation in the 1,4-structured portions of the block, said partially hydrogenated block copolymer having an iodine number between 50 and 150.

2. A partially hydrogenated block copolymer according to claim 1 showing substantially no absorbance at 10.98 and 10.05 microns.

3. A partially hydrogenated block copolymer according to claim 1 having the structure prior to hydrogenation of

A—B wherein A is a monovinyl arene polymer block and B is a butadiene polymer block.

4. A partially hydrogenated block copolymer according to claim 1 having the general structure prior to hydrogenation of

A—B—A wherein A is a monovinyl arene polymer block and B is a butadiene polymer block.

5. A partially hydrogenated block copolymer according to claim 1 having the general structure prior to hydrogenation of $$A-(B-A)_{1-5}$$

wherein A is a monovinyl arene polymer block and B is a butadiene polymer block.

6. A partially hydrogenated block copolymer according to claim 1 having the general structure prior to hydrogenation of $$A-B-(B-A)_{1-5}$$

wherein A is a monovinyl arene polymer block and B is a butadiene polymer block.

7. A partially hydrogenated block copolymer according to claim 6 wherein A is a poly(alpha methyl styrene) block.

8. A partially hydrogenated block copolymer according to claim 4 having the general structure, prior to hydrogenation polystyrene-polybutadiene-polystyrene.

* * * * *